United States Patent
Rudolph et al.

[11] 3,765,167
[45] Oct. 16, 1973

[54] POWER PLANT PROCESS

[75] Inventors: Paul Rudolph, Bad Homburg; Ernst Kapp, Frankfurt am Main, both of Germany

[73] Assignee: Metallgesellschaft Aktiengesellschaft, Frankfurt am Main, Germany

[22] Filed: Mar. 6, 1972

[21] Appl. No.: 232,210

Related U.S. Application Data

[62] Division of Ser. No. 66,257, Aug. 24, 1970.

[52] U.S. Cl. ............... 60/39.02, 208/125, 208/130, 60/39.18 R, 60/39.18 B, 60/38, 60/39.12
[51] Int. Cl. .. F01k 25/08, F01k 23/00, F01k 23/10
[58] Field of Search .................... 60/37, 38, 39, 40, 60/50, 108, 1, 39.12, 39.02, 39.18 R, 39.18 B, 39.71; 208/130, 132

[56] References Cited
UNITED STATES PATENTS

| | | | |
|---|---|---|---|
| 3,304,712 | 2/1967 | Pacault et al. | 60/39.18 B |
| 3,320,154 | 5/1967 | Tokuhisa et al. | 208/130 |
| 3,325,992 | 6/1967 | Sheldon | 60/39.18 B |
| 3,329,605 | 7/1967 | Tokuhisa et al. | 60/37 UX |
| 3,374,621 | 3/1968 | Pacault et al. | 60/39.18 B |
| 3,505,811 | 4/1970 | Underwood | 60/39.18 R X |
| 3,355,877 | 12/1967 | Chaffiotte | 60/39.17 X |
| 2,605,610 | 8/1952 | Hermitte et al. | 60/39.17 |

Primary Examiner—Martin P. Schwadron
Assistant Examiner—A. M. Ostrager
Attorney—Burgess, Dinklage & Sprung

[57] ABSTRACT

In a turbine power plant, fluid hydrocarbon fuel is first cracked with steam under pressure; the cracked compressed gas is then expanded in a gas turbine to perform work and thereafter burned in a boiler to generate steam to drive a steam turbine. The cracked, compressed gas may also be expanded to an intermediate pressure in a gas turbine to perform work, combusted under pressure, the combusted, compressed gas expanded in a second gas turbine to perform work and then fed to a boiler where the heat of the combusted gas is utilized to generate steam to drive a steam turbine. The cracked, compressed gas may also be fully expanded in a gas turbine to perform work and thereafter combusted and a portion of the hot combustion gas therefrom is fed to a boiler to generate steam to drive a steam turbine and the balance is recycled to an externally heated cracker and then to the boiler.

7 Claims, 3 Drawing Figures

POWER PLANT PROCESS

RELATED APPLICATION

This application is a division of copending application, Ser. No. 66,257, filed Aug. 24, 1970.

BACKGROUND

The present invention relates to a power plant process in which hydrocarbon-containing, liquid or gaseous fuels are fired.

Steam boiler power plants have been fired for years with solid fuels; more recently, liquid or gaseous fuels have been fired in such plants. Power plant processes using gas turbines have been restricted to the use of liquid and/or gaseous fuels. Such fuels are generally burned with a large surplus of air in a combustion chamber which precedes the gas turbine, to which the hot flue gas is admitted. Two-stage power plant processes are known in which two gas turbines are used and the gas for driving the second gas turbine is produced from the high-oxygen exhaust gas of the first gas turbine by afterburning said exhaust gas together with added gaseous or liquid fuels.

SUMMARY

It has been found that the power plant process using gas turbines and liquid or gaseous (fluid) hydrocarbons as fuel may be improved if the feed fuel is thermally or catalytically cracked with steam and/or oxygen (air), and, if desired, with carbon dioxide and under a pressure which is higher than the operating pressure in the combustion chamber, to form a mixture of carbon monoxide and hydrogen. This cracked gas is then expanded to perform work in a gas turbine to the inlet pressure of the succeeding power plant process. This succeeding power plant process may be carried out in a gas turbine power plant or a steam boiler plant and begins in either case in a combustion chamber which produces hot combustion gas.

THE DRAWINGS

DESCRIPTION

The feed hydrocarbons may be thermally or catalytically cracked with steam in an endothermic reaction with an indirect supply of heat, e.g., in a tubular heater. Alternatively, the cracking may be effected in an autothermic process with steam and an addition of oxygen or air or mixtures thereof and carbon dioxide may also be admixed to the feed mixture.

The power plant process according to the invention is characterized in that the fuel before being burnt is cracked with steam and under a pressure which is higher than the pressure in the combustion chamber to produce a gas which is high in CO and $H_2$ and is expanded to perform work in a gas turbine before it is admitted to the combustion chamber. The fuel consists preferably of hydrocarbon mixtures which can be cracked with steam by the known steam reforming process and are either available at a pressure which is higher than the pressure in the combustion chamber or can be pressurized to said elevated pressure.

At first glance, the operation according to the invention may seem to involve an uneconomical complication of the power plant process. A calculation surprisingly shows, however, that the quantity of heat required in the power plant process according to the invention for the generation of electric power is distinctly lower than in comparable known power plant processes.

This advantage is probably due to the fact that the gas produced by a cracking of hydrocarbons has a substantially larger volume than the feed materials fuel and steam and any added oxygen, air or carbon dioxide.

It is apparent from the following reaction equations that in the least favorable case, in which methane is used, this increase in volume is by a factor of 2:

$$CH_4 + 1/2\ O_2 = CO + 2H_2 \text{ (partial oxidation, exothermic)}$$

$$CH_4 + H_2O = CO + 3H_2 \text{ (Cracking with steam, endothermic)}$$

$$CH_4 + CO_2 = 2CO + 2H_2 \text{ (endothermic)}$$

This factor F increases as the C number of the hydrocarbon-containing fuel is increased. The following equations are applicable to ethane:

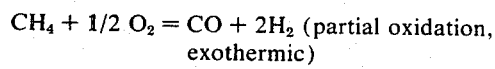
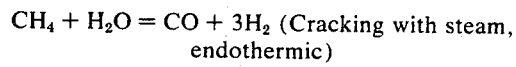
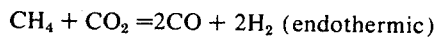

The following equations are applicable to butane:

The factors range from 2.6 to 3.

Liquid hydrocarbons can be pressurized to a higher pressure by a pump having a capacity which corresponds to the liquid volume. The work of compression is required to pressurize gaseous hydrocarbons to that higher pressure unless said gases are available under a sufficiently elevated pressure, such as is the case, e.g., with natural gas and with some exhaust gases from refineries.

When the primary cracked gas, which consists mainly of carbon monoxide and hydrogen, has been expanded to perform work, the expanded gas may be supplied in the process according to the invention to a steam boiler power plant or a turbine power plant. Both embodiments are shown by way of Example in FIGS. 1 to 3 in flow schemes.

Figure 1:
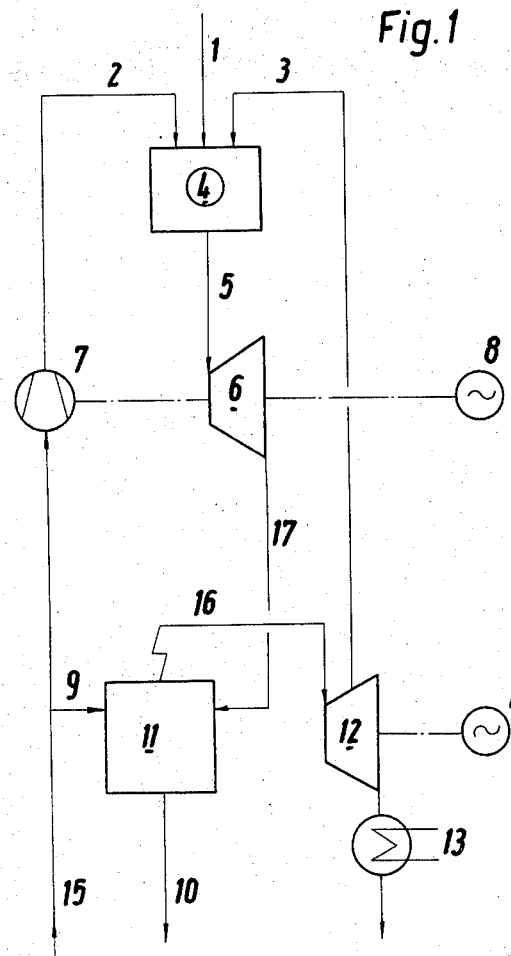
FIG. 1 is a flow diagram illustrating the power plant process of this invention.

In the plant according to FIG. 1, the process of the invention involves expansion of a cracked gas produced under pressure prior to being fed to a steam turbine power plant.

Figure 2:
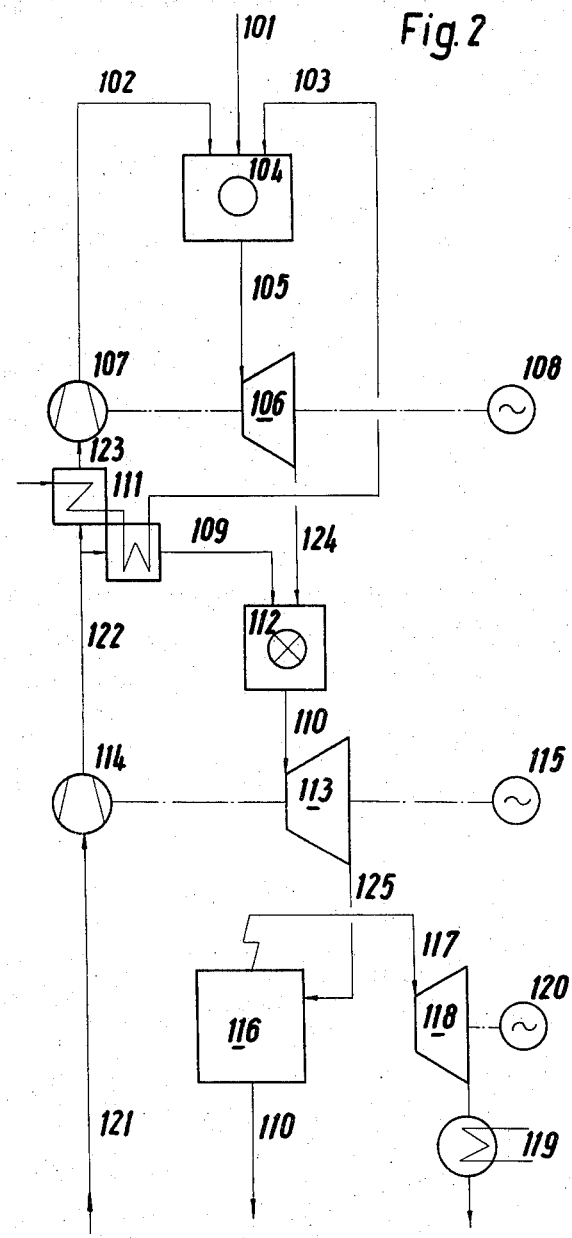
FIG. 2 is a flow diagram illustrating an alternate embodiment of the power plant process of this invention.

In the plant shown in FIG. 2, the power plant to which the cracked gas produced under pressure is admitted is a gas turbine power plant.

Figure 3:
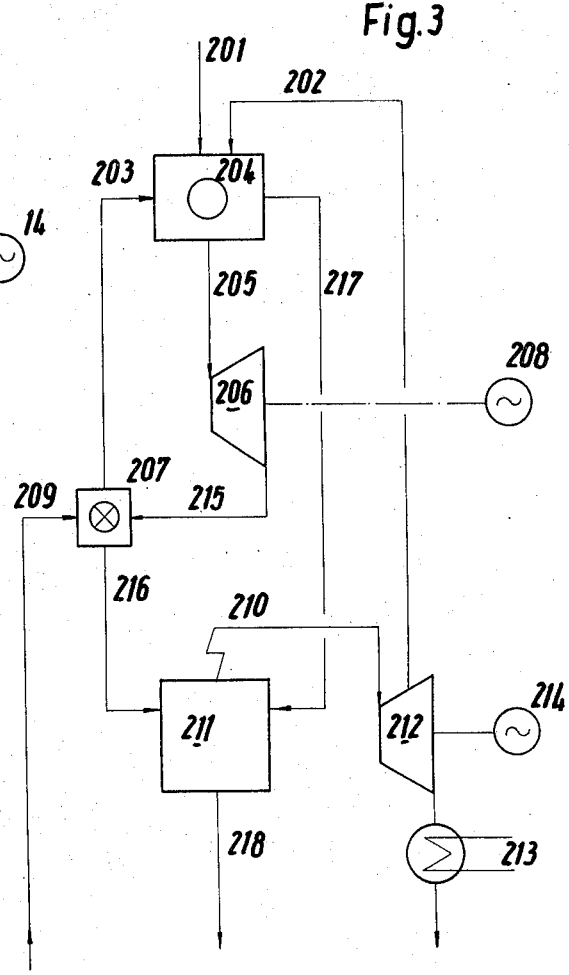
FIG. 3 is a flow diagram illustrating another alternate embodiment of the power plant process of this invention.

In the plant shown in FIG. 3, hydrocarbons are cracked in an indirectly heated tubular heater, which is succeeded by a steam turbine power plant.

The plant according to FIG. 1 comprises a cracking reactor 4, a gas turbine 6, which drives an air compressor 7 and an electric generator 8, a steam boiler 11, a steam turbine 12 provided with a condenser 13, and an electric generator 14.

In this case, the cracking reactor consists of a shaft furnace which is filled with a cracking catalyst, e.g., a nickel catalyst on a magnesia support.

The feed hydrocarbons used as a fuel are subjected to autothermic cracking with steam, which is extracted by a conduit 3 from a medium-pressure outlet of the steam turbine 12, and with an addition of air. The fuel itself is supplied through conduit 1. Air is pressurized in the compressor 7 to the pressure in the cracking reactor and is supplied through conduit 2 to the reactor 4 to supply the heat required for the endothermic cracking reaction. Fuel, steam and air are mixed in known manner as or before they enter the cracking reactor.

The cracked gas produced in the cracking reactor 4 is conducted through conduit 5 to the turbine 6 and expanded in the latter to the ambient pressure. The work performed by the turbine is expended in the air compressor 7 and the electric generator 8. The cracked gas which has been expanded and cooled flows from turbine 6 through a conduit 17 to the combustion chamber of the steam boiler 11 and is burnt therein with air which has been preheated in known manner by a utilization of waste heat and is supplied through conduit 9. The flue gas is exhausted through conduit 10. The steam which is generated in the steam boiler 11 flows in conduit 16 to a multi-stage steam turbine 12, from which part of the steam is extracted behind the first stage under the pressure which is required to crack the fuel in the reactor 4. The remaining steam is expanded to ambient pressure in the second stage of the steam turbine 12 and is then condensed in the condensor 13.

In the embodiment shown in FIG. 2, the inserted fuel is cracked under a much higher pressure so that the cracked gas which has been expanded can be burnt under a higher pressure.

The plant shown in FIG. 2 consists of a cracking reactor 104, a first gas turbine 106 used to expand the cracked gas, a combustion chamber 112, a second gas turbine 113 fed with flue gas, a waste heat boiler 116, a steam turbine 118 provided with a condenser 119, air compressors 114 and 107 and electric generators 108, 115, 120.

The hydrocarbons fed as a fuel are supplied into the cracking reactor 104 through conduit 101. The air which is required for autothermic cracking is sucked through conduit 121 by the first compressor 114, precompressed by the latter to the mean pressure in the combustion chamber, and conducted through a conduit 122 and a waste heat boiler 111, in which the heat of compression is utilized to produce the team for the cracking reaction. Part of the precompressed air is branched off behind the waste heat boiler 111 by a conduit 109 and supplied to the combustion chamber 112 of the second gas turbine. The other part is supplied in conduit 123 to the second compressor 107, in which the air is compressed to the pressure of the cracking reaction and discharges the compressed air through conduit 102 to the cracking reactor 104. The steam for the cracking reaction is supplied from waste heat boiler 111 through conduit 103 to cracking reactor 104. The cracked gas produced under pressure flows from the cracking reactor in conduit 105 to the first gas turbine 106, in which the gas is expanded to an intermediate pressure to perform work. The work is performed in the second air compressor 107 and the electric generator 108.

The cracked gas which has been expanded to intermediate pressure flows from the gas turbine 106 through the conduit 124 to the combustion chamber 112 of the second gas turbine and is burnt in the latter with precompressed air from conduit 109. The resulting hot combustion flue gas is conducted in conduit 110 to the second gas turbine 113 and is expanded therein to ambient pressure with performance of work. The work performed in the gas turbine 113 is expanded in the first air compressor 114 and the electric generator 115.

The exhaust gas from the second gas turbine is conducted through conduit 125 to the waste heat boiler 116 and is passed from the latter through conduit 110 to the chimney.

The steam produced in waste heat boiler 116 is passed in conduit 117 to the steam turbine 118 and is deposited behind the same in condenser 119. The steam turbine 118 drives the electric generator 120.

The plant shown in FIG. 3 consists of a cracking reactor 204, a gas turbine 206, which drives an electric generator 208, a steam boiler 211 and a steam turbine 212, which is provided with a condenser 213 and drives an electric generator 214. In this case, the cracking reactor 204 is an externally heated tubular heater, the tubes of which are filled with a cracking catalyst, e.g., a nickel catalyst on an alumina support. Hence, the hydrocarbons fed as fuel are cracked with steam and with a supply of sensible heat.

Steam is extracted through a conduit 202 from an intermediate-pressure outlet of the steam turbine 212. Fuel is fed through conduit 201. Hot flue gas is supplied through conduit 203 and caused to flow around the cracking tubes to deliver part of its sensible heat. The cracked gas produced in the cracking reactor 204 is supplied through conduit 205 to the turbine 206, which drives the electric generator 208. The cracked gas which has been expanded in the turbine flows through a conduit 215 to a combustion chamber 207, in which it is burnt with air from conduit 209. Part of the flue gas flows through conduit 216 directly to the steam boiler 211. The remaining flue gas is conducted in conduit 203 to the cracking reactor 204 and when it has delivered part of its sensible heat is also supplied to the steam boiler 211 through 217. The cooled flue gas is exhausted from the steam boiler through conduit 218. The steam which has been generated flows through conduit 210 into the turbine 212, in which part of the steam is extracted behind the first expansion stage and supplied through conduit 202 to the cracking reactor 204. The remaining steam is completely expanded and condensed in condenser 213. The turbine drives the electric generator 214.

The invention will now be explained more fully with reference to the following examples:

EXAMPLE 1

In the embodiment shown in FIG. 1, 1.17 standard cubic meters methane 1 having a net calorific value corresponding to 10,000 kilocalories are catalytically cracked under a pressure of 10 kilograms per square centimeter absolute pressure and at a temperature of 820°C. in a cracking unit 4 supplied with 4 standard cubic meters air 2 and 0.754 standard cubic meters steam 3. 7.43 standard cubic meters moist gas 5 are thus formed, which has the following composition:

| | |
|---|---|
| $CO_2$ | 5.6% by volume |
| $CO$ | 10.1% by volume |

| H₂ | 30.3% by volume |
| N₂ | 42.7% by volume |
| H₂O | 11.3% by volume |
| Total: | 100.0% by volume |

The calorific value is 1,086 kilocalories per standard cubic meter. This gas is admitted at 820°C to the gas turbine 6, where it is expanded to ambient pressure with utilization of the temperature gradient to 390°C. In this operation, the turbine performs work corresponding to 1.33 kWh. 0.45 kWh being expended in the air compressor 7, 0.88 kWh of electric energy are generated in the electric generator 8.

The gas exhausted from the turbine has the following heat content:

| Heat due to calorific value | 8060 kilocalories |
| Sensible heat | 965 kilocalories |
| Total: | 9025 kilocalories |

The expanded gas is burnt with 7.2 standard cubic meters of air 9 to produce 13.13 standard cubic meters of flue gas 10, the heat of which is used to generate steam in a steam boiler 11. The steam drives the steam turbine 12, which is provided with a condenser 13. The steam turbine 12 drives the electric generator 14, which generates electric power.

A good steam power process requires 2,200 kilocalories per kWh if all losses are taken into account;

| Heat available in the gas | 9025 kilocalories |
| Heat content of generated steam | 410 kilocalories |
| From the remainder of | 8615 kilocalories |

8615:2200 = 3.92 kWh are generated. The total air requirement 15 of this operation is 11.2 standard cubic meters.

In the overall process, 10,000 kilocalories are converted into 3.92 + 0.88 = 4.80 kWh. The heat rate of 10,000 : 4.8 = 2,080 kilocalories per kWh is lower than the figure of 2,200 kilocalories per kWh in the known process used for a comparison.

EXAMPLE 2

In the embodiment shown in FIG. 2, 1.17 standard cubic meters of methane 101 are also cracked in the cracking unit 104, which is supplied with 4 standard cubic meters air 102 and 0.754 standard cubic meters steam 103. In this case, cracking is effected under a pressure of 40 kilograms per square centimeter absolute pressure and at 820°C on a catalyst.

Under these conditions, the cracked gas contains methane in view of equilibrium requirements so that a small additional amount of methane passes through the cracking unit without being changed therein. This additional amount of methane has not been taken into account in the calculation because it does not change the basic process. The above reference to 1.17 standard cubic meters of methane thus relates only to the methane which is completely cracked to form also 7.43 standard cubic meters of gas 105 having the same composition as in Example 1.

The pressure is reduced to 10 kilograms per square centimeter absolute pressure in a gas turbine 106 so that a temperature of 540°C. is obtained and 0.88 kWh are generated, 0.27 kWh of which are expended in the air compressor 107 so that 0.61 kWh of electric energy are generated in the electric generator 108. The steam required in the cracking unit is generated in this case in the waste heat boiler 111 from feed water heated with waste heat from the compressed air.

The gas is then burnt in the combustion chamber 112 with a total of 43.3 standard cubic meters of air 109 to produce 49.23 standard cubic meters flue gas 110, which at a temperature of 820° C enters the second gas turbine 113 and is expanded therein to ambient pressure, whereby a temperature of 390°C is obtained. This results in a generation of 8.75 kWh, of which 5.25 kWh are expended in the air compressor 114 to compress 43.3 + 4.0 standard cubic meters of air to a pressure of 10 kilograms per square centimeter absolute pressure so that 3.5 kWh of electric energy are generated in the generator 115.

The exhaust gases are cooled to 100°C in a succeeding waste heat boiler 116 so that additional 6.7 kilograms of steam 117 under a pressure of 10 kilograms per square centimeter absolute pressure are generated. A steam turbine 118 provided with a condenser 119 drives the lectric generator 120, which generates 1.14 kWh of electric energy. The electric energy produced in the overall process thus amounts to 0.61 + 3.50 + 1.14 = 5.25 kWh so that the heat rate is 1,900 kilocalories per kWh. The total air requirement 121 amounts to 47.3 standard cubic meters.

EXAMPLE 3

A true comparison process may be carried out in the plant of FIG. 2. This comparison process begins in the combustion chamber 112 and comprises burning the 1.17 standard cubic meters methane directly with 54.4 standard cubic meters air 109 to produce 55.5 standard cubic meters flue gas 110, which is admitted to the gas turbine 113 at a temperature of 820°C.

As the flue gas is expanded to ambient pressure in the gas turbine 113, the temperature drops to 390°C and 9.85 kWh are generated. 6.05 kWh are expended in the air compressor 114 so that the electric generator 115 generates 3.80 kWh of electric energy.

The flue gas is again cooled in the waste heat boiler 116 to generate 7.5 kilograms steam 117 under a pressure of 10 kilograms per square centimeter absolute pressure. This steam is used to generate 1.28 kWh by means of a steam turbine 118, provided with the condenser 119, and of the electric generator 120.

The electric energy produced in the overall process thus amounts to 3.80 + 1.28 = 5.08 kWh.

The heat rate of 1,970 kilocalories per hour is higher than in the process according to the invention. The air requirement is also correspondingly higher.

EXAMPLE 4

In the embodiment shown in FIG. 3, 1.17 standard cubic meters methane 201 having a heat content of 10,000 kilocalories due to the net calorific value, are catalytically cracked under a pressure of 10 kilograms per square centimeter absolute pressure and at 820°C in a tubular cracking unit 204 supplied with 3.06 standard cubic meters H₂O 202 and with flue gas 203. The flue gas supplied to the cracking unit delivers 4,050 kilocalories to the cracking reaction, which results in the formation of 6.57 standard cubic meters of moist gas 205 having the following composition:

| CO₂ | 5.1% |
| CO | 12.7% |

| | |
|---|---|
| $H_2$ | 58.5% |
| $H_2O$ | 23.7% |

The calorific value is 1,886 kilocalories per standard cubic meter. This gas is admitted at 820°C to the gas turbine 206, where it is expanded to ambient pressure. The turbine performs work amounting to 1.18 kWh, and this work is expended in the electric generator 208 to generate electric energy. The expended gas exhausted from the gas turbine is burnt in a combustion chamber 207 supplied with 11.2 standard cubic meters air, whereby 15.34 standard cubic meters of hot flue gas are produced. 6.86 standard cubic meters of that flue gas are supplied through conduit 203 to cracking unit 204 and leave the latter by conduit 217 at about 900°C and are further utilized in the steam boiler 211. The remaining 8.57 standard cubic meters of flue gas directly enter the steam boiler. The steam generated in the steam boiler drives the steam turbine 212, which is provided with a condenser 213. The steam turbine 212 drives the electric generator 214, which generates electric energy.

At 820°C., the cracked gas has the following heat content:

| | |
|---|---|
| Heat due to calorific value | 12,400 kilocalories |
| Sensible heat | 1,870 kilocalories |
| Total: | 14,270 kilocalories |

Of that heat, 1,014 kilocalories are consumed in the gas turbine so that the cracked gas supplied to the combustion chamber contains 13,256 kilocalories. The same heat quantity is contained in the flue gas because the air temperature is assumed to be 0°C. As 4,050 kilocalories are delivered from the flue gas to the cracking unit, the remainder which is available for the steam boiler amounts to 9,204 kilocalories. The steam delivered from the turbine 212 to the cracking unit has a heat content of 1,660 kilocalories so that the remainder which is available to generate electric energy amounts to 7,546 kilocalories and can be used in a good steam power process to generate 7,546:2,200 = 3.40 kWh.

In the overall process, 10,000 kilocalories are converted into 1.18 + 3.40 = 4.58 kWh and the heat rate of 2,180 kilocalories per kWh is still slightly lower than the figure of 2,200 kilocalories per kWh in the known comparison process.

What is claimed is:

1. Power plant process comprising:
   a. cracking a fluid hydrocarbon fuel with steam and/or air under pressure to form a gaseous mixture high in carbon monoxide and hydrogen;
   b. expanding the cracked compressed gaseous mixture from (a) to an intermediate pressure in a gas turbine to perform work;
   c. thereafter combusting said gaseous mixture at said intermediate pressure in a combustion chamber; and
   d. feeding the hot combustion gas from (c) to a second gas turbine and expanding same therein to perform work.

2. Process of claim 1 wherein said fuel is catalytically cracked.

3. Process of claim 1 wherein said fuel is thermally cracked.

4. Process of claim 1 wherein the expanded combustion gas from said second gas turbine is fed to a boiler to generate steam to drive a steam turbine.

5. Process of claim 2 wherein the catalyst is heated by the hot combustion gas from said combustion chamber.

6. Process of claim 3 wherein said fuel is thermally cracked with steam and air in the presence of carbon dioxide.

7. Process of claim 2 wherein said fuel is catalytically cracked with steam in the presence of carbon dioxide.

\* \* \* \* \*